(12) United States Patent
Kung et al.

(10) Patent No.: US 7,772,807 B2
(45) Date of Patent: Aug. 10, 2010

(54) METHOD FOR CHARGING PORTABLE ELECTRONIC DEVICE

(75) Inventors: Shao-Tsu Kung, Taipei (TW); Yi-Hung Shen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 802 days.

(21) Appl. No.: 11/693,730

(22) Filed: Mar. 30, 2007

(65) Prior Publication Data
US 2008/0036426 A1      Feb. 14, 2008

(30) Foreign Application Priority Data
Aug. 8, 2006 (TW) .............................. 95129032 A

(51) Int. Cl.
*H02J 7/00* (2006.01)
*G06F 1/32* (2006.01)
*G06F 1/00* (2006.01)

(52) U.S. Cl. ..................... 320/160; 713/320; 713/322

(58) Field of Classification Search ............... 320/132, 320/160; 713/310, 320, 322–324
See application file for complete search history.

(56) References Cited

U.S. PATENT DOCUMENTS 6,657,415 B2   12/2003   Saeki et al.
6,697,953 B1 *   2/2004   Collins ................... 713/320
7,117,377 B2 * 10/2006   Hagiwara et al. ......... 713/300

FOREIGN PATENT DOCUMENTS

| CN | 1196999 C   | 4/2005  |
|----|-------------|---------|
| CN | 1862910     | 11/2006 |
| JP | 10-143295   | 5/1998  |
| JP | 11-004549   | 1/1999  |
| JP | 2002-199616 | 7/2002  |
| JP | 2003-079067 | 3/2003  |

* cited by examiner

*Primary Examiner*—Edward Tso
*Assistant Examiner*—Richard V Muralidar
(74) *Attorney, Agent, or Firm*—Jianq Chyun IP Office

(57) ABSTRACT

A method for charging portable electronic device is disclosed. When the portable electronic device is connected to a power source, the method selects a protecting mode or a fast charging mode to charge the battery according to the current operating status of the portable electronic device. Simultaneously, the battery power is also controlled within a safety range. Therefore, the invention can charge the battery of the portable electronic device at a high speed without affecting the efficiency of the device. Moreover, the battery is also protected from being overcharged to extend the life of the battery.

16 Claims, 4 Drawing Sheets

METHOD FOR CHARGING PORTABLE ELECTRONIC DEVICE

CROSS-REFERENCE TO RELATED APPLICATION

This application claims the priority benefit of Taiwan application serial no. 95129032, filed Aug. 8, 2006. All disclosure of the Taiwan application is incorporated herein by reference.

BACKGROUND OF THE INVENTION

1. Field of the Invention

The present invention relates to a charging method, and more particularly to a method for charging portable electronic devices.

2. Description of Related Art

Currently, power supplies for portable electronic devices can be divided into two main types. One type of power supplies is external power supply. The other type of power supplies is battery. Generally, portable electronic devices are intended for use in the outdoors. Under such circumstance where there is no external power supply available to the electronic device, the only power source available to the portable electronic device is the battery installed in the device. In other words, batteries are the main power supply for portable electronic devices. Thus, the efficiency of a portable electronic device depends on whether its power supply is continuous and stable and whether its battery can be quickly and effectively charged.

At present, in most portable electronic devices, a charging process begins when the batteries are connected to an external power source and the charging process stops when the power of the battery is full. Nevertheless, batteries perform self-discharge. Therefore, the power capacity of a battery in a portable electronic device usually lowers after the battery has stopped charging for a period of time. Then, the battery in the portable electronic device is recharged.

FIG. 1 is a flowchart illustrating a conventional method for charging a battery of a portable electronic device. Referring to FIG. 1, the conventional method for charging the battery includes charge modes such as normal mode and trickle mode. When a portable electronic device is connected to a power source, it receives a control signal first (step S 10). Next, the portable electronic device decides a charge mode for charging the battery based on the received control signal (step S120), wherein the charge mode to be decided includes a normal mode (step S 130) and a trickle mode (step S140). Nonetheless, regardless of the charge mode being used, portable electronic devices detects whether the battery is full or not during the charging process (step S150).

If the battery is detected to be fully charged, the charging process is terminated (step S160). Then, the battery gradually discharges and its power is gradually lowered. Hence, the method returns to step S110 to reselect the charge mode for charging the battery. However, if the battery is detected to be partially charged, the battery is charged using the previously selected charge mode till the battery is full (step S170). After the battery is fully charged, the method likewise returns to step S110 and receives another control signal to decide the charge mode for charging the battery again. The processes of charging, discharging, and then recharging are repeated to ensure the battery stays fully charged. Nonetheless, repeating these processes increases the number of times for charging the battery and the capability of the battery for storing charges deteriorates as the number of times for charging the battery increases. As a result, the way for charging a battery using the conventional method shortens the life of the battery.

Further, if a user still operates the portable electronic device when the battery is being charged by an external power supply, conceivably most of the power provided by the power supply is used for the operation of the portable electronic device. As a result, the battery cannot be charged using maximum charging power so that the amount of time required to charge the battery is prolonged.

SUMMARY OF THE INVENTION

Accordingly, the present invention provides a method for charging portable electronic devices that selects either a fast charging mode or a protecting mode to charge the battery according to the user's needs and the operation of the computer in order to save the power of the battery and increases the charging speed.

To achieve the aforementioned and the other objectives, the present invention provides a method for charging portable electronic devices that can be used for charging the battery of the portable electronic devices. This method includes the followings steps. (a) A control signal is received. (b) A fast charging mode or a protecting mode is selected to execute according to the received control signal. (b1) If a fast charging mode is selected, a power-saving process is performed. (b2) If a protecting mode is selected, then whether the power of the battery is smaller than a first reference value is determined. (b2-1) If the power of the battery is determined to be smaller than the first reference value, the battery is charged. (c) The battery is charged till the power reaches a second reference value.

According to a preferred embodiment of the present invention, wherein, after step (b2), further comprising step (b2-2) of not charging the battery if the power of the battery is greater than the first reference value.

According to a preferred embodiment of the present invention, wherein the fast charging mode or the protecting mode is selected to execute at any time based on the need of the user, and the control signal corresponding to the charge mode selected by the user is generated by the portable electronic device.

According to a preferred embodiment of the present invention, wherein the power-saving process includes either dimming the screen backlight source or reducing the speed of the processor.

According to a preferred embodiment of the present invention, wherein the first reference value is a value between 1% to 10% of the power capacity of the battery and the second reference value is a value between 90% to 100% of the power capacity of the battery.

According to a preferred embodiment of the present invention, wherein the portable electronic device includes a laptop computer, a mobile phone, and a personal digital assistant (PDA) and the battery includes a nickel-metal hydride (NiMH) battery and a lithium ion (Li-ion) battery.

The present invention provides a method for charging portable electronic devices that can be used to manage the power of the battery of portable electronic devices. The method includes the following steps. First, a control signal is received and used to determine whether to execute a protecting mode. If the protecting mode is executed, then if the power of the battery is smaller than a first reference value is determined. If the power of the battery is smaller than the first reference value, the battery is charged till the power of the battery reaches a second reference value. If the protecting mode is not executed, a fast charging mode is executed for performing a power-saving process and then whether the power of the battery is smaller than the first reference value is determined. If the power of the battery is smaller than the first reference value, the battery is charged till its power reaches the second reference value.

According to a preferred embodiment of the present invention, wherein, prior to receiving the control signal, whether the power of the battery is smaller than a third reference value is further determined. If the power of the battery is smaller than the third reference value, the user is prompted to decide whether to execute the protecting mode. Further, the control signal is generated based on the user's preference.

The present invention employs a structure for switching between the protecting mode and the fast charging mode. When the portable electronic device is connected to a power supply, a control signal inputted by the user is detected to decide the suitable charging mode, such that the power consumption is reduced and the charging efficiency is increased.

In order to the make the aforementioned and other objects, features and advantages of the present invention comprehensible, a preferred embodiment accompanied with figures are described in detail below.

DESCRIPTION OF EMBODIMENTS

The best way to protect a battery from shortening its life time due to repeated charging and discharging is not to overcharge it. Therefore, an upper limit value can be set to prevent the battery from charging over this value. Similarly, a lower limit value can be set to initiate charging when the power of the battery is below this value. Hence, overcharging can be prevented. In order to make the present invention more understandable, embodiments are described below as the examples to prove that the invention can actually be realized.

Figure 1:
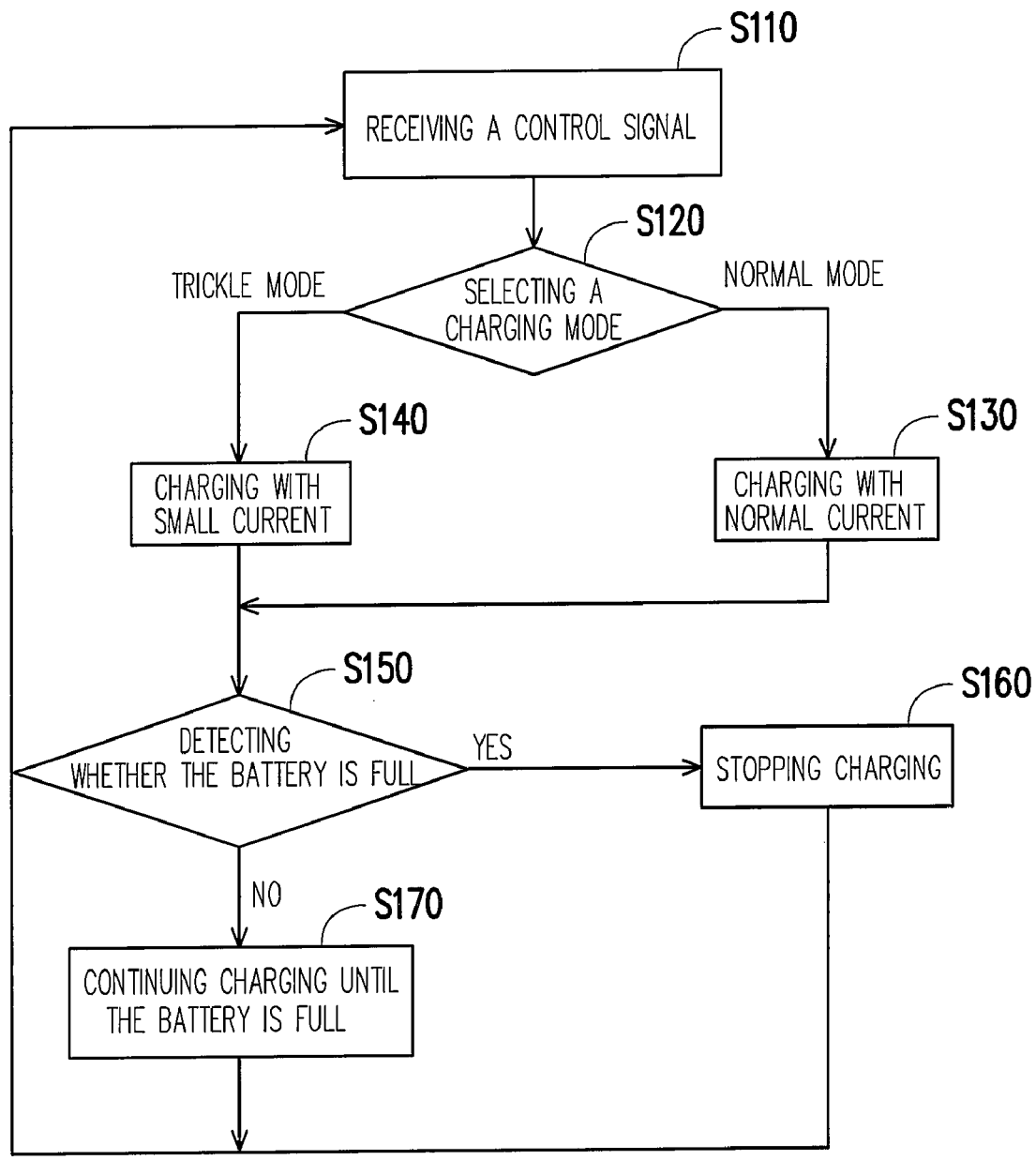
FIG. 1 is a flowchart illustrating a conventional method for charging a battery of a portable electronic devices.
Figure 2:
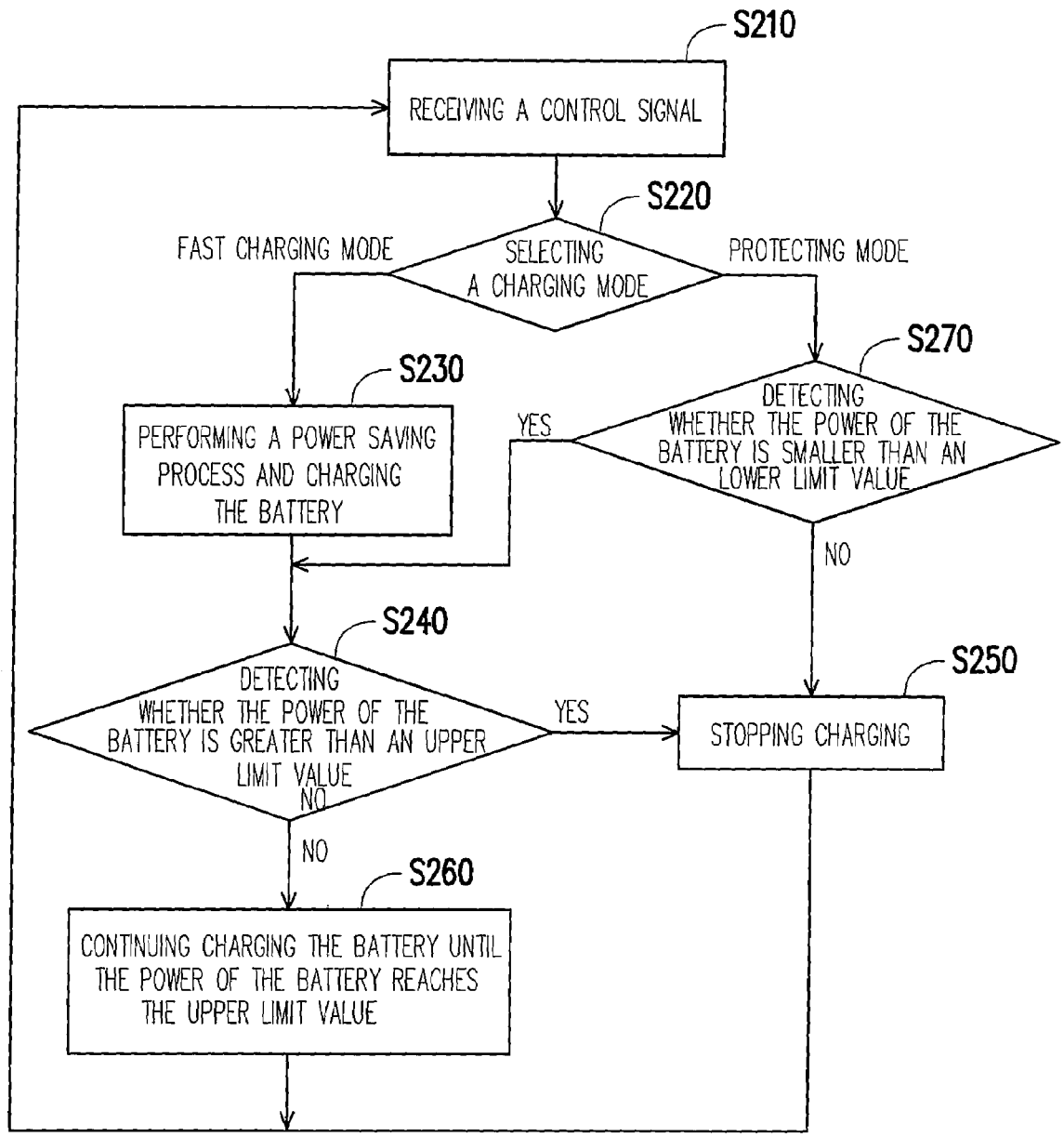
FIG. 2 is a flowchart illustrating a method for charging a portable electronic device according to the preferred embodiment of the present invention.

FIG. 2 is a flowchart illustrating a method for charging a portable electronic device according to the preferred embodiment of the present invention. Referring to FIG.2, the charging method of the present embodiment includes setting a charging range for charging a battery of the portable electronic device. Herein, the portable electronic device includes, but not limited to, a laptop computer, a mobile phone or a personal digital assistant (PDA) and the battery includes, but not limited to, a nickel-metal hydride (NiMH) battery or a lithium ion (Li-ion) battery. The present embodiment includes the following steps.

First, the portable electronic device receives a control signal to initiate charging (step S210). Herein, the control signal can be generated according to either a function key selected or inputted by the user or the operating status of the portable electronic device.

Next, the portable electronic device selects a fast charging mode or a protecting mode according to the received control signal (step S220). If the fast charging mode is selected, a power-saving process is performed (step S230). Herein, the power-saving process includes, but not limited to, dimming the backlight source or reducing the speed of the processor. Once the power-saving process is initiated, the portable electronic device begins charging the battery and detects whether the power of the battery is greater than an upper limit value (step S240). If the power of the battery is greater than the upper limit value, the portable electronic device terminates the charging process (step S250). On the other hand, if the power of the battery is smaller than the upper limit value, the portable electronic device continues the charging process till the power of the battery reaches the upper limit value (step S260). The fast charging mode is able to provide most power to the battery through performing the power-saving process, thus increasing the speed of the charging process. This type of charge mode is suitable for users and occasions that require fast charging and frequent battery usage.

Nonetheless, if the protecting mode is selected, the portable electronic device then determines if the power of the battery is smaller than a lower limit value (step S270). If the power of the battery is smaller than the lower limit value, the method proceeds to step S240 to determine if the power of the battery is greater than the upper limit value. However, if the power is greater than the lower limit value, the portable electronic device does not charge the battery (step S250). Instead, the method returns to step S210 to wait for the next incoming control signal to decide the charge mode for charging the battery. In view of the above, the protecting mode according to the present invention sets a protection range (i.e., the range between the upper limit value and the lower limit value) for charging the battery. Therefore, when the power of the battery is greater than the lower limit value, the battery is not charged. Hence, the battery is prevented from unnecessary repetition of charging and discharging, which ultimately results in damages to the battery. Compared to the fast charging mode, the protecting mode is more suitable for users who use battery less frequently.

It should be noted that, according to the present embodiment, the user can still switch the charging mode to the protecting mode when executing the fast charging mode when needed, so as to prevent overcharging the battery. Besides, the protection range of the protecting mode (i.e., the upper and the lower limit values) can be defined within a certain range of the full capacity of the battery. For instance, the protection range can be set to be between 50% and 100% of the full capacity of the battery. Initially, the operating range of the battery is limited to the first 50%. After the operating portion of the battery has deteriorated, the protection range is then reset to be between 0% and 50% of the full capacity of the battery. This kind of setting can approximately double the life time of a battery, thus lowering the costs incurred by damages to the battery.

Figure 3:
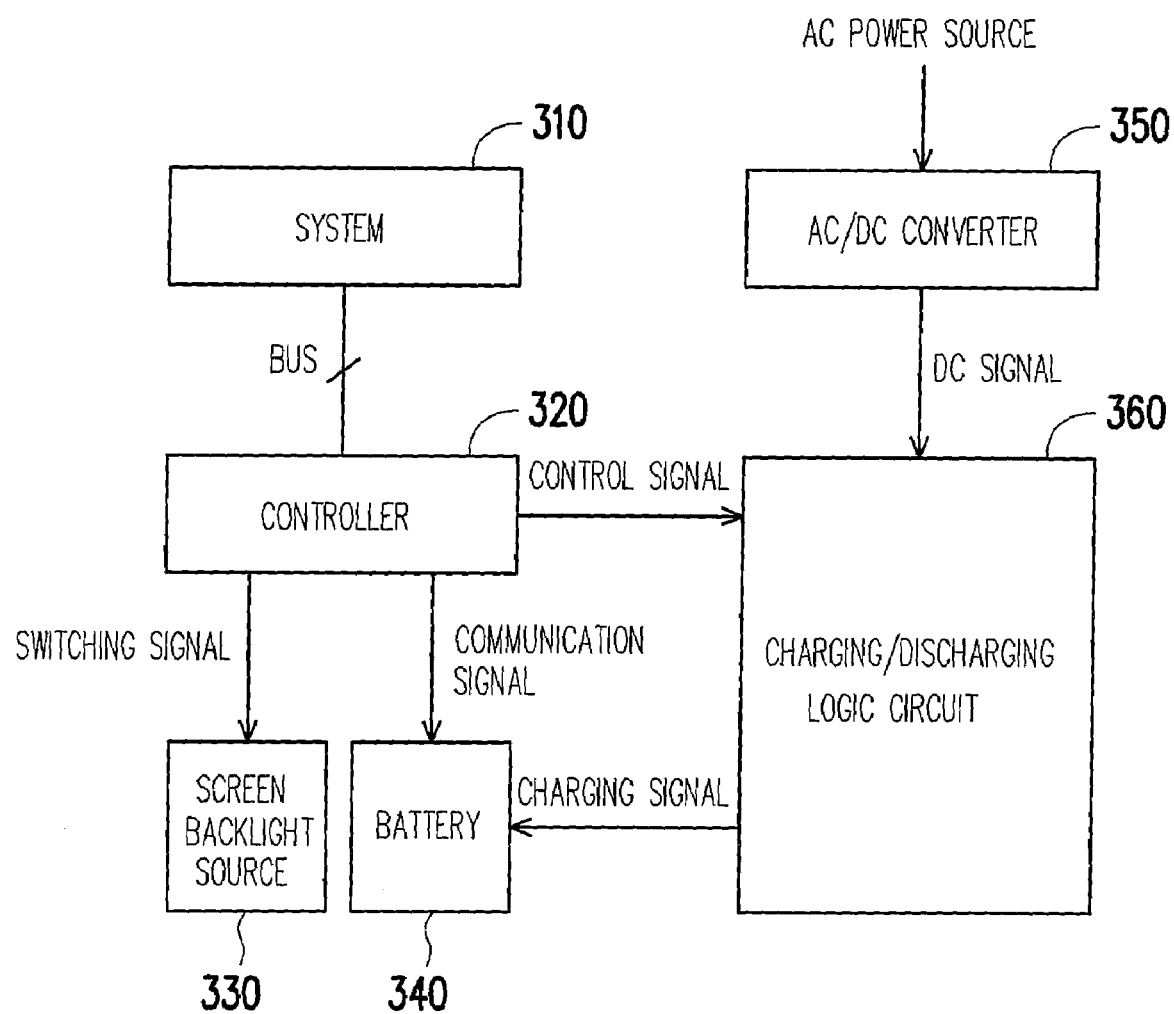
FIG. 3 is a block diagram schematically illustrating a system for charging a portable electronic device according to the preferred embodiment of the present invention.

Accordingly, the signal transmission process for the charging method of the present invention is further illustrated below based on the actual configuration of the present invention. FIG. 3 is a block diagram schematically illustrating a system for charging a portable electronic device. Referring to FIG. 3, a system 310 is connected to a controller 320 through a bus. Further the system 310 transmits an adjusting signal to the controller 320 to define the upper and lower limit values for charging the battery. When the user connects the plug of the portable electronic device to a socket, an alternating current (AC) power source is converted to a direct current (DC) signal by an AC/DC converter 350 and inputted to a charging/discharging logic circuit 360. In the meantime, the controller 320 detects the power of a battery 340 and decides to execute a fast charging mode or a protecting mode according to a communication signal returned from the battery 340 and the adjusting signal provided by the system 310.

If the fast charging mode is selected, the controller 320 transmits a switching signal to a screen backlight source 330 to turn off or dim the screen backlight source 330. Simultaneously, the controller 320 transmits a control signal to the charging/discharging logic circuit 360 for controlling the charging/discharging logic circuit 360 to transmit a charging signal to the battery 340 for charging. The charging process is terminated after the power of the battery 340 reaches the upper limit value.

On the other hand, if the protecting mode is selected, the controller 320 immediately detects whether the power of the battery 340 is smaller than the lower limit value, and charge the battery 340 until the power of the battery 340 reaches the upper limit value if the power of the battery 340 is determined to be smaller than the lower limit value.

According to another embodiment of the present invention, when a portable electronic device is connected to a power source, either the protecting mode that provides a smaller charging current or the fast charging mode that provides a larger charging current for fast charging can be selected based on the user's needs or the current operation of the computer.

Figure 4:
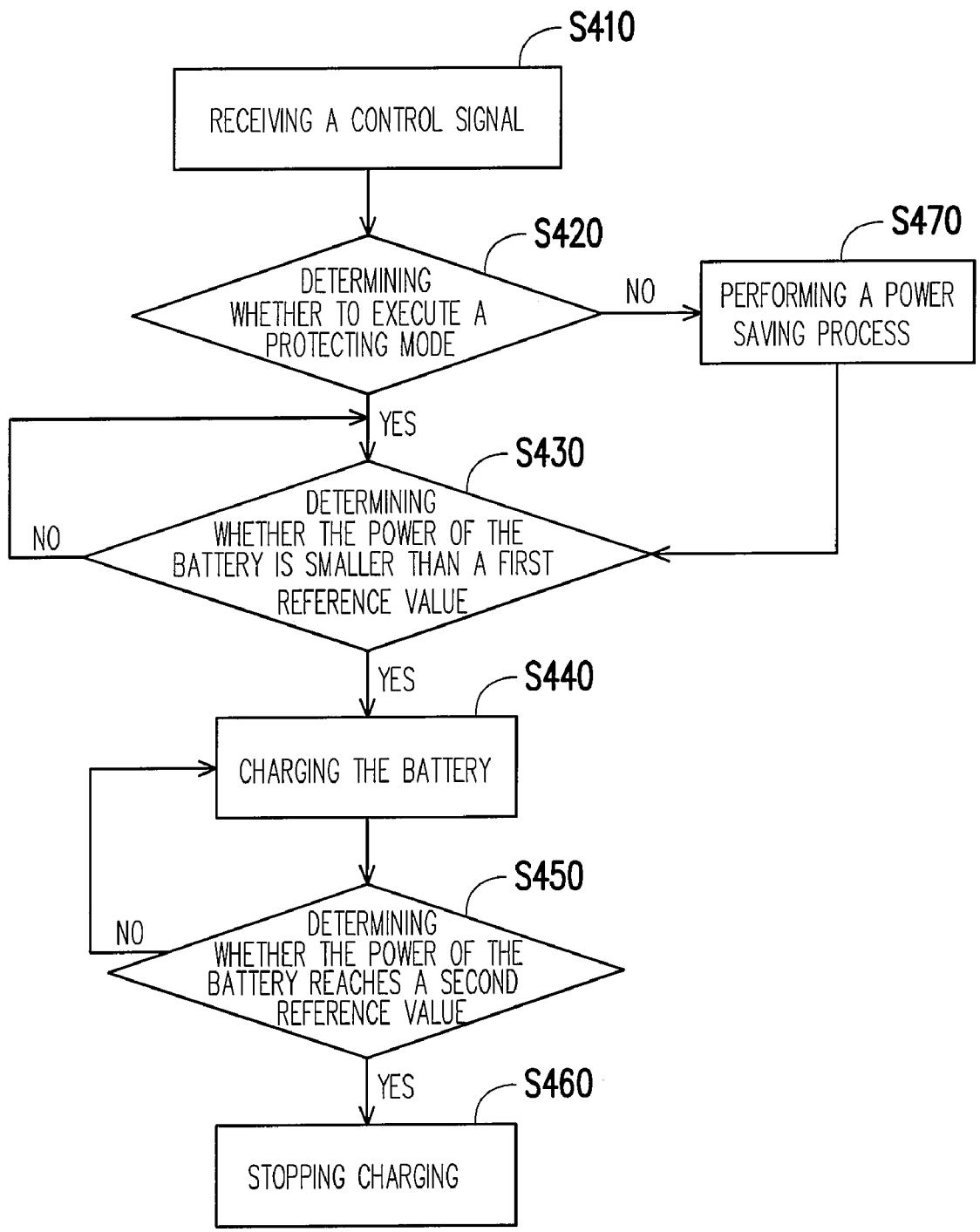
FIG. 4 is a flowchart illustrating a method for charging a portable electronic device according to the preferred embodiment of the present invention.

FIG. 4 is a flowchart illustrating the method for charging a portable electronic device according to the preferred embodiment of the present invention. Referring to FIG. 4, the present embodiment can be used to manage the power of a battery of the portable electronic device. Herein, the portable electronic device includes, but not limited to, a laptop computer, a mobile phone or a personal digital assistant (PDA) and the battery includes, but not limited to, a nickel-metal hydride (NiMH) battery and a lithium ion (Li-ion) battery. The present embodiment includes the following steps.

First, the portable electronic device receives a control signal to initiate charging (step S410). Herein, the control signal can be generated according to either a function key selected or inputted by the user or the operating of the portable electronic device.

Next, the portable electronic device determines whether to execute a protecting mode based on the received control signal (step S420). If the protecting mode is executed, the portable electronic device determines whether the power of the battery is smaller than a first reference value (step S430). If the power of the battery is determined to be smaller than the first reference value, the battery is charged (step S440), and then the power of the battery is determined whether reaches a second reference value (step S450). The charging process is terminated when the power of the battery reaches the second reference value (step S460). Herein, the first reference value can be, but not limited to, between 1% and 10% of the power capacity of the battery and the second reference value can be, but not limited to, between 90% and 100% of the power capacity of the battery.

If the portable electronic device determines not to execute the protecting mode in step S420, it executes a fast charging mode and performs a power-saving process (step S470). Simultaneously, the portable electronic device also determines whether the power of the battery is smaller than a first reference value (step S430). If the power of the battery is determined to be smaller than the first reference value, the battery is charged (step S440), and then the power of the battery is determined whether reaches the second reference value (step S450). The charging process is terminated when the power of the battery reaches the second reference value (step S460). Herein, the above-mentioned power-saving process includes, for instance, dimming the screen backlight source or reducing the speed of the processor, which can be configured according to the user's preference. Certainly, if the user does not need to use the screen or execute some other functions during the charging process, the user can turn off the screen or other auxiliary devices through configuration.

According to the above-mentioned fast charging mode, the portable electronic device has saved most of the power consumption. Therefore, the power source can provide an ample amount of current for charging the battery. Under such circumstance, the charging time can be shortened so as to achieve the purpose of fast charging.

It should be noted that, when the portable electronic device is connected to a power source, the user can select the protecting mode or the fast charging mode to execute according to the user's needs. For instance, if the user needs the portable electronic device to play a video, he can select the protecting mode to charge the battery such that the portable electronic device can properly display frames with normal brightness and volume without affecting the display quality. On the contrary, if the user merely needs the portable electronic device to play music, he can select the fast charging mode to turn off the functionless screen or reduce the speed of the processor while charging the battery. Therefore, the unnecessary power consumption can be saved and the speed of the charging process can be increased.

Additionally, when the portable electronic device is connected to a power source, the device can detect the power of the battery by itself and determine whether the power of the battery is lower than a third reference value (e.g. 20% of the original power capacity of the battery). If the power of the battery is lower than the third reference value, the user is prompted to select the protecting mode and reminded of noticing the remaining power of the battery.

Accordingly, the method for charging a portable electronic device of the present invention includes at least the following advantages:

1. The battery of the portable electronic device is not charged every time the plug of the device is connected to a power source, thus reducing the number of times for charging the battery and extending the life time of the battery.

2. The battery of the portable electronic device is charged by using either the protecting mode or the fast charging mode according to the user's preference, such that the charging process is speeded up without affecting the operating efficiency of the portable electronic device.

3. The charging range for the capacity of the battery is defined by the upper and lower limit values, so as to prevent overcharging or over-discharging the battery, thus extending the life time of the battery.

Although the present invention has been disclosed above by the embodiments, they are not intended to limit the present invention. Anybody skilled in the art can make some modifications and alterations without departing from the spirit and scope of the present invention. Therefore, the protecting range of the present invention falls in the appended claims.

What is claimed is:

1. A method for charging portable electronic devices, suitable for charging a battery of a portable electronic device, comprising:
   (a) receiving a control signal;
   (b) selecting a fast charging mode or a protecting mode according to the control signal;
      (b1) performing a power-saving process if the fast charging mode is selected;
      (b2) determining whether the power of the battery is smaller than a first reference value if the protecting mode is selected;

(b2-1) charging the battery if the power of the battery is smaller than the first reference value; and (c) charging the battery till the power of the battery reaches a second reference value.

2. The method of claim 1, wherein, after step (b2), further comprises step (b2-2) of not charging the battery if the power of the battery is greater than the first reference value.

3. The method of claim 1, wherein the protecting mode or the fast charging mode is selected to execute at any time based on the need of the user, and the control signal corresponding to the charge mode selected by the user is generated by the portable electronic device.

4. The method of claim 1, wherein the power-saving process comprises dimming the screen backlight source or reducing the speed of the processor.

5. The method of claim 1, wherein the first reference value is between 1% and 10% of the power capacity of the battery.

6. The method of claim 1, wherein the second reference value is between 90% and 100% of the power capacity of the battery.

7. The method of claim 1, wherein the portable electronic device comprises a laptop computer, a mobile phone, or a personal digital assistant (PDA).

8. The method of claim 1, wherein the battery comprises a nickel-metal hydride (NiMH) battery or a lithium ion (Li-ion) battery.

9. A method for charging portable electronic devices, suitable for charging a battery of a portable electronic device, comprising:

receiving a control signal;

determining whether to execute a protecting mode according to the control signal;

determining whether the power of the battery is smaller than a first reference value if the protecting mode is executed;

charging the battery till the power of the battery reaches a second reference value if the power of the battery is smaller than the first reference value;

executing a fast charging mode for performing a power-saving process and determining whether the power of the battery is smaller than a first reference value if the protecting mode is not executed; and charging the battery till the power of the battery reaches the second reference value if the power of the battery is smaller than the first reference value.

10. The method of claim 9, wherein, before the portable electronic device receives the control signal, further comprises:

determining whether the power of the battery is smaller than a third reference value;

prompting the user to decide whether to select the protecting mode if the power of the battery is smaller than a third reference value; and generating the control signal according to the user's decision.

11. The method of claim 9, wherein the protecting mode or the fast charging mode is selected to execute at any time based on the need of the user, and the control signal corresponding to the charge mode selected by the user is generated by the portable electronic device.

12. The method of claim 9, wherein the power-saving process comprises dimming the screen backlight source or reducing the speed of the processor.

13. The method of claim 9, wherein the first reference value is between 1% and 10% of the power capacity of the battery.

14. The method of claim 9, wherein the second reference value is between 90% and 100% of the power capacity of the battery.

15. The method of claim 9, wherein the portable electronic device comprise a laptop computer, a mobile phone, or a personal digital assistant (PDA).

16. The method of claim 9, wherein the battery comprises a nickel-metal hydride (NiMH) battery or a lithium ion (Li-ion) battery.

* * * * *